United States Patent [19]
Hafner

[11] 4,009,764
[45] Mar. 1, 1977

[54] LUBRICATING APPARATUS FOR CONVEYOR CHAINS

[76] Inventor: Henry F. Hafner, 9030 Saranac, Richmond Heights, Mo. 63117

[22] Filed: Aug. 7, 1975

[21] Appl. No.: 602,774

Related U.S. Application Data

[62] Division of Ser. No. 472,299, May 22, 1974, Pat. No. 3,903,994.

[52] U.S. Cl. .............................................. 184/15 A
[51] Int. Cl.² ......................................... F16N 13/22
[58] Field of Search ............... 184/15 A, 15 B, 1 C, 184/15 R, 3 R, 6.1

[56] References Cited
UNITED STATES PATENTS

| | | | |
|---|---|---|---|
| 2,593,841 | 4/1952 | Burchsted | 184/15 B |
| 3,116,810 | 1/1964 | Olson | 184/15 B |
| 3,684,059 | 8/1972 | Stoner | 184/15 B |

FOREIGN PATENTS OR APPLICATIONS

| | | | |
|---|---|---|---|
| 186,294 | 7/1956 | Austria | 184/15 R |
| 22,212 | 1/1930 | Netherlands | 184/15 R |

Primary Examiner—Richard J. Apley
Assistant Examiner—William R. Browne
Attorney, Agent, or Firm—Gravely, Lieder & Woodruff

[57] ABSTRACT

An apparatus for lubricating a chain has a follower bar which rides the rollers between the rows of chain links on each side of the chain, and accordingly maintains a predetermined lateral position with respect to the chain. Oil nozzles are carried by the follower bar and are directed toward the links. The nozzles are supplied with oil from a pneumatically operated ejector which is controlled by a fluidic control device including an air jet and a fluidic sensing unit aligned with the jet. The chain passes between the nozzle and the fluidic sensing unit and is positioned such that the rollers in it periodically interrupt or disperse the air jet so that the air jet at one instant passes through the chain and impinges on the sensing unit and at another instant is dispersed by a roller. The restoration of the air jet after it is dispersed is sensed by the sensing unit which directs a signal to the ejector, causing the ejector to discharge a metered amount of oil each time a roller passes through the air jet. The oil nozzles are positioned such that the oil so delivered flows onto the chain at locations where adjacent links in each row are joined.

10 Claims, 5 Drawing Figures

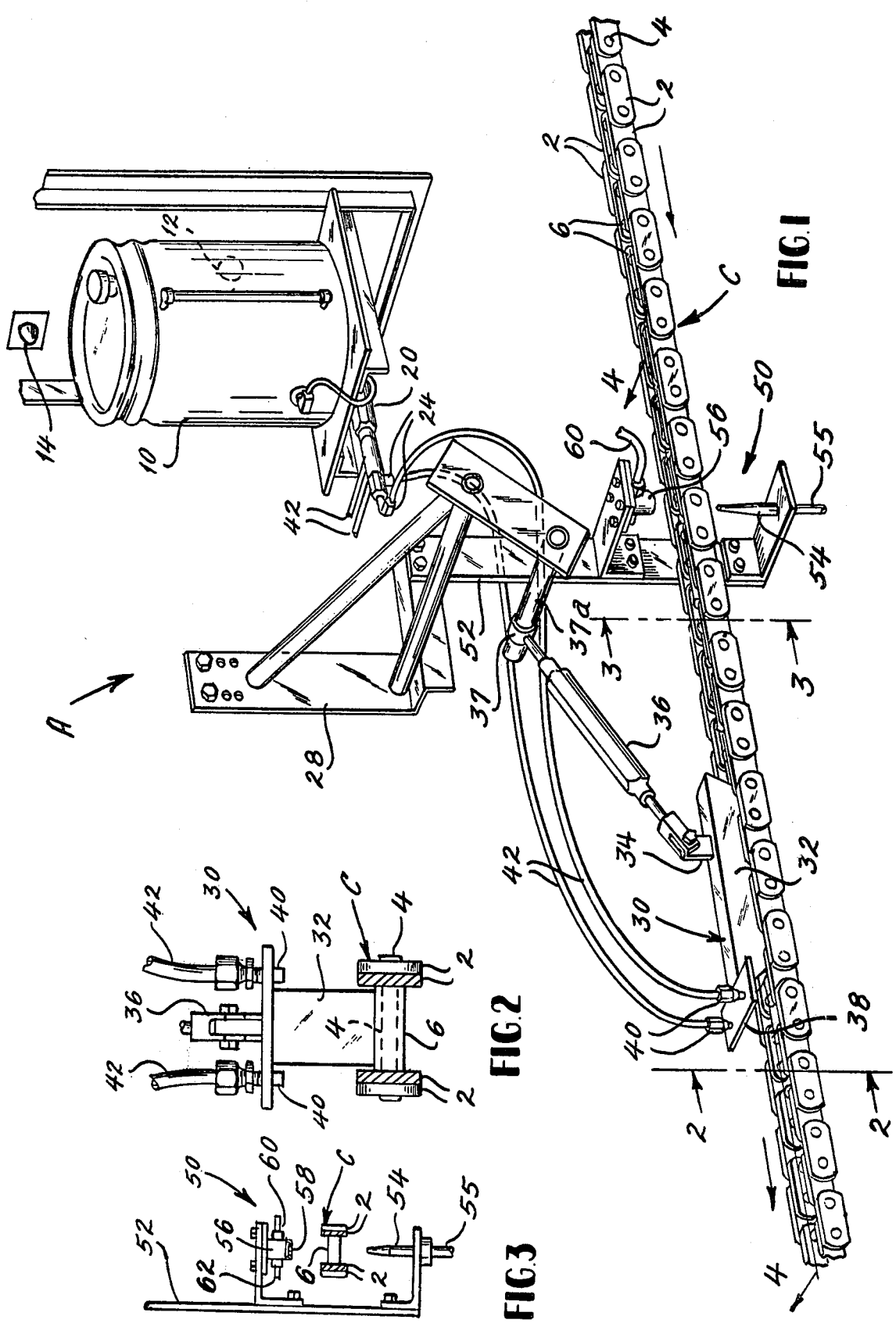

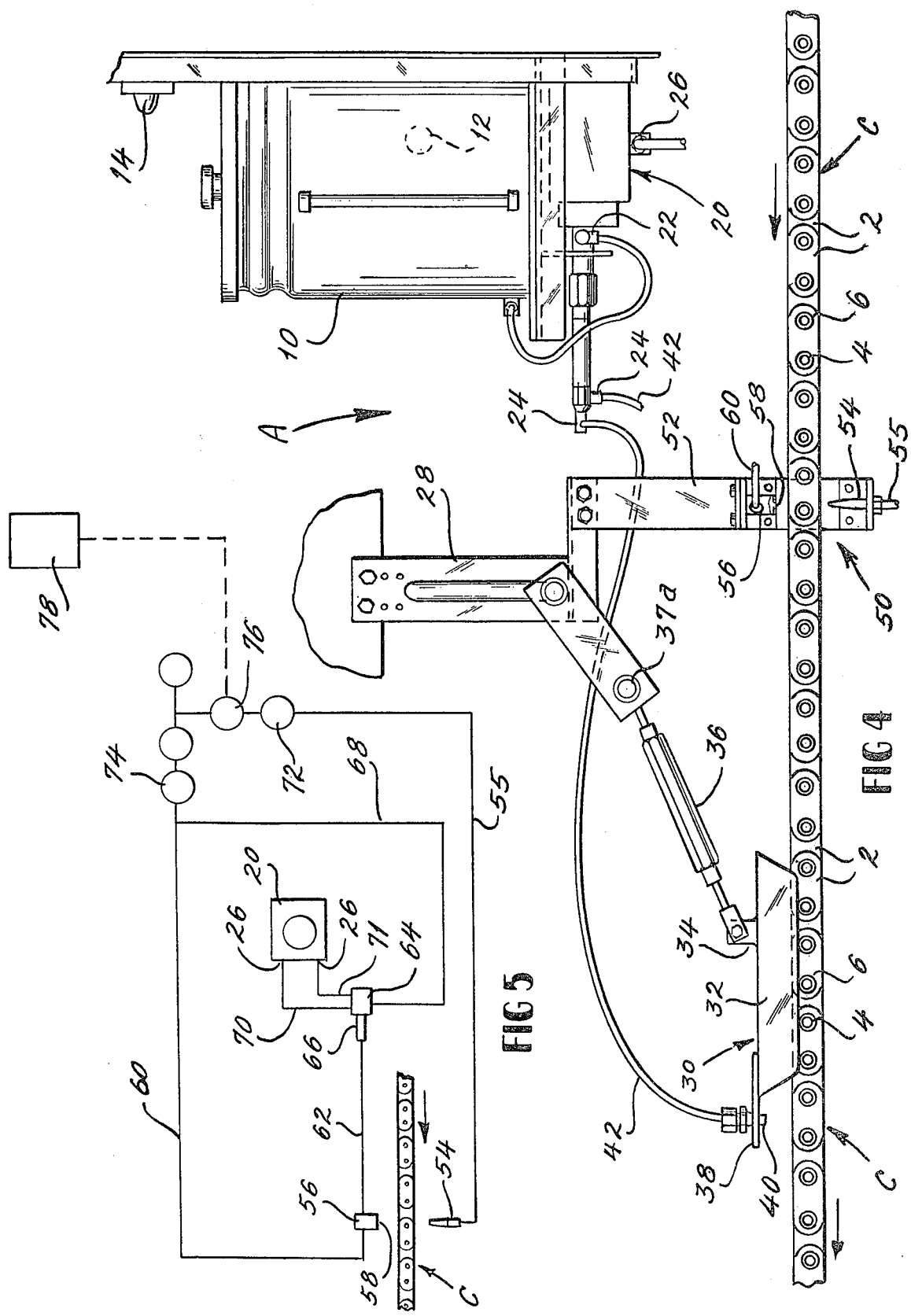

LUBRICATING APPARATUS FOR CONVEYOR CHAINS

This application is a division of pending application Ser. No. 472,299, filed May 22, 1974, now U.S. Pat. No. 3,903,994.

BACKGROUND OF THE INVENTION

This invention relates in general to lubricating devices and more particularly to a lubricating apparatus for conveyor chains.

Many conveyors utilize chains to transport material from one location to another, and unless the pivot points of the chains are kept well lubricated, the chains will bind and wear rapidly. The problem is particularly acute where the chains are used to convey material or objects through a heated atmosphere. For example, in lithographic processes it is often desirable to transport the lithographed material through an oven to dry the ink. The chains used in the conveyors pass through lubricating devices and are lubricated at least every 24 hours and often more frequently.

Heretofore, devices have been developed for dripping oil onto conveyor chains, but the application of oil is haphazard at best and the chances of it reaching the wear and binding points of the chain are not good. Another procedure involves passing the chain through a brush, the bristles of which are saturated with oil. These bristles wear rapidly and once worn they do not contact the chain and supply it with adequate lubrication. Still another means of lubricating such chains is to spray oil on them, but this wastes a considerable amount of oil.

Aside from the foregoing disadvantages, conveyor chains do not maintain a precise lateral position, but on the contrary move laterally to a limited extent in operation, and as a result devices for lubricating the chains do not always deposit the lubrication in the correct lateral position.

OBJECTS OF THE INVENTION

One of the principal objects of the present invention is to provide a lubricating apparatus for distributing small measured amounts of lubricant to precise positions along a conveyor chain. Another object is to provide a lubricating apparatus of the type stated which includes sensing means for activating the apparatus without actually contacting the conveyor chain. A further object is to provide a lubricating apparatus of the type stated which follows lateral movement of the chain so that the lubricant is always deposited in the proper lateral position. Yet another object is to provide a lubricating apparatus of the type stated which is easily installed on existing chain-type conveyors. These and other objects and advantages will become apparent hereinafter.

The present invention is embodied in a chain lubricating apparatus including means for delivering oil to specific locations along the chain. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is a perspective view of a chain lubricator constructed in accordance with and embodying the present invention;

FIG. 2 is a sectional view taken along lines 2—2 of FIG. 1 and showing the chain follower;

FIG. 3 is a sectional view taken along lines 3—3 of FIG. 1 and showing the fluidic control assembly;

FIG. 4 is a sectional view taken along lines 4—4 of FIG. 1; and

FIG. 5 is a schematic view of the pneumatic circuitry of the chain lubricator.

DETAILED DESCRIPTION

Referring now to the drawings (FIG. 1), A designates an apparatus for lubricating an endless conveyor chain C having pairs of parallel links 2 arranged two rows and with adjacent links 2 of each row being connected together by cross pins 4. In other words, the links 2 along one side of the chain C form one row and the links 2 along the other side form another row, even though adjacent links 2 of each row are side-by-side at the cross pins 4. Each pin 4 carries a roller 6 which maintains proper spacing between the links 2 on each side of it. Hence, the pins 4 and rollers 6 constitute cross pieces between the links 2 on each side of the chain. The links 2 of adjacent pairs overlap at the pins 4 and consequently rub against each other at these locations. Unless properly lubricated at these locations, the links 2 will wear excessively and will not pivot easily relative to one another, thus causing the chain C to bind. Of course, when the chain C binds, it will not pass easily over sprocket wheels or idlers.

The lubricating apparatus A includes an oil reservoir 10 provided with a float 12 or other device for sensing the level of the oil in it. The float 12 may be connected through suitable circuitry to a signal light 14 to provide an alarm when the oil level becomes too low.

Mounted beneath the reservoir 10 is a pneumatic oil ejector 20 having an oil inlet port 22 (FIG. 4) which is connected to the bottom of the reservoir 10 so that oil will drain by gravity into the ejector 20. The ejector 20 also has a plurality of oil discharge ports 24 and air inlet ports 26. When the air inlet ports 26 are pressurized with high pressure air, the ejector 20 will deliver a measured quantity of oil from each oil discharge port 24. When the air pressure is released the ejector 20 resets itself so that the next time it is pressurized it will eject another metered quantity of oil. The ejector 20 is capable of resetting itself almost instantaneously so that it will eject oil at closely spaced time intervals. A suitable oil ejector 20 is manufactured by Lincoln St. Louis Co. of St. Louis, Mo. and marketed under the name SYNCHROJET. It is disclosed in U.S. patents.

In addition to the reservoir 10 and the oil ejector 20, the lubricating apparatus A (FIG. 1) includes a fixed main bracket 28 which is mounted on a suitable supporting structure adjacent to the conveyor chain C. The bracket 28 restrains a chain follower 30 which rides on either the upper or lower pass of the chain C and maintains the same lateral position with respect to the chain C, even when the chain C moves laterally with respect to the fixed bracket 28. The chain follower 30 has a follower bar 32 which is slightly less in width than the spacing between the two rows of links 2 in the chain C (FIG. 2). The bar 32 fits between these rows of links 2 and is confined laterally by them. The bar 32 rests upon the rollers 6, and is long enough to span several rollers 6 (FIG. 4). It has beveled leading and trailing end faces so that it tends to glide over the tops of the rollers 6 as the chain C moves, rather than snag upon them. Projecting upwardly from the follower bar 32 is a tab 34 to which one end of a restraining link 36 is connected. The opposite end of the link 36 is connected to the fixed bracket 28 by means of a collar 37 which slides along a horizontal rod 37a on the fixed bracket 28. The connections between the ends of the links 36 and the bracket 28 and tab 34 permit the chain follower 30 to move up and down as well as laterally so that the follower 30 follows the chain C and maintains the same lateral position on it at all times. The restraining link 36 includes a turnbuckle so that its length can be varied to adjust the longitudinal position of the chain follower 30 along the chain C.

At its leading end the follower bar 32 is provided with a mounting plate 38 (FIGS. 1, 2 and 4) having a pair of oil nozzles 40 fitted therein. The nozzles 40 are on each side of the plate 38 and are located directly above the links 2 at each side of the chain C (FIG. 2). Indeed, the nozzles 40 are positioned to be directed precisely at the interfaces between adjacent overlapping links 2 connected by the pins 4 within the chain C. The nozzles 40 are connected to flexible hoses 42, and each hose 42 is connected to one of the several discharge ports 24 of the oil ejector 20.

Normally, the chain C is operated in synchronism with another chain C, and that other chain C likewise has a chain follower 30 supported on it. Hence, it is customary to have four oil discharge ports 24 on the ejector 20 and four flexible hoses 42 leading from the ejector 20.

The fixed bracket 28 also supports a fluidic control unit or assembly 50 (FIGS. 1, 3 and 4) which is located adjacent to the chain C and controls the operation of the oil ejector 20. The control unit 50 includes a supporting bracket 52 which is attached to and depends from the fixed bracket 28. The bracket 52 carries an air nozzle 54 which is connected to a high pressure air supply line 55. The nozzle 54 is positioned beneath the chain C and is directed upwardly between the links 2 along each side of the chain C (FIG. 3). Thus, the air jet issuing from the nozzle 54 will either pass through the spaces between the links 2 on each side of the chain C or will impinge against the rollers 6, in which case the air jet is dispersed or interrupted. In addition, the bracket 52 carries a fluidic sensing unit 56 which is located above the chain C and has a downwardly opening aperture 58 (FIGS. 3 and 4) which aligns with the nozzle 54. Thus, when the jet of air issuing from the air nozzle 52 is not blocked by a roller 6 on the chain C, it will pass through the space between the row of links 2 along each side of the chain C and will enter the aperture 58 in the sensing unit 56. The sensing unit 56 is connected to a source of high pressure air through an air line 60 and when the jet of air from the nozzle 54 enters its downwardly presented aperture 58, the sensing unit 56 permits the high pressure air from the line 60 to flow into a control line 62. However, when the air jet from the nozzle 54 is dispersed, the fluidic sensing unit 56 interrupts or blocks the flow of high pressure air from the supply line 60 to the control line 62.

The fluidic control unit 50 controls an air operated valve 64 (FIG. 5) having a pilot 66 connected to the control line 62 leading from the sensing unit 56. The valve 64 is connected to a high pressure supply line 68 and is further connected to the air inlet port 26 of the oil ejector 20 through connecting lines 70 and 71.

When the pilot 66 is operated as a result of high pressure air being introduced into the control line 62 at the sensing unit 56, it opens the valve 64 and places the supply line 68 in communication with the connecting line 70 so that high pressure air is delivered to the oil ejector 20, causing it to discharge oil through its discharge ports 24. On the other hand, when the air pressure on the pilot 66 is released, the valve 64 directs high pressure air through the line 71 to the ejector 20, causing the ejector to reset itself.

Each of the high pressure supply lines 55, 60 and 68 (FIG. 5) is connected to a single source of high pressure air. The supply line 55 is provided with its own regulator 72 for regulating the pressure therein, while the pressure in the supply lines 60 and 68 is controlled by a common regulator 74. The supply line 55 also has a solenoid valve 76 which is operated by a switch positioned at a remote location or it may be automatically operated by a suitable timer 78. The solenoid valve 76 is also controlled by the float 12 within the reservoir 10 so that it will not open when the level of oil in the reservoir is too low. This prevents air from being introduced into the oil ejector 20 and oil lines 42.

OPERATION

Normally the solenoid valve 76 is closed and no air issues from the air nozzle 54 or impinges against the fluidic sensing unit 56. As a result, the air operated valve 64 remains closed and the oil ejector 20 does not deliver any oil to the oil nozzles 40.

When it is desired to lubricate the chain C, the solenoid valve 76 is opened, either manually by a conventional switch or automatically by the timer 78. This causes air to flow through the supply line 55 and issue from the air nozzle 54 at the end of it. Since this air jet is directed between the rows of links 2 on each side of the chain C (FIGS. 3 and 4) it is interrupted or dispersed at periodic intervals when the rollers 6 and the chain C pass through it. When the air jet is not interrupted, that is when it passes through the chain C, it impinges on the fluidic sensing unit 56, entering that unit through the downwardly opening aperture 58 therein. The fluidic sensing unit 56 senses the air jet and places the control line 62 in communication with the supply line 60, and as a result the pilot 66 of the valve 64 operates. This causes high pressure air to be delivered through the lines 68 and 70 to the oil ejector 20 which in turn delivers a metered quantity of oil to all of the oil hoses 42. An equivalent amount of oil is forced out of the oil nozzles 40 and onto the links 2 of the chain C.

However, when the jet of air issuing from the air nozzle 54 is dispersed or interrupted by a chain roller 6 passing through it, the fluidic sensing unit 56 isolates the control line 62 from the supply line 60 and the air operated valves 64 closes. This in turn causes the valve 64 to direct high pressure air to the oil ejector 20 through the line 71 to enable the ejector 20 to reset or recharge itself so that the next time it is pressurized it will eject another metered quantity of oil from its oil discharge ports 24. In this regard, it should be noted that the oil ejector 20 is capable of resetting itself very rapidly.

Thus, as the chain C passes through the fluidic control assembly 50, the jet of air issuing from the air nozzle 54 is interrupted periodically, that is each time one of the chain rollers 6 passes through it. Consequently, a metered quantity of oil is delivered to the chain C immediately after each roller 6 passes beyond the jet of air from the air nozzle 54. The position of the chain follower 30 on the chain C is adjusted by rotating the turnbuckle on the link 36 so that the metered quantity of oil will flow onto the chain exactly at the pins 4. Hence, the oil works between the overlapping faces of adjacent links 2 which are joined at the pins 4, and no binding or excessive wear will occur at these locations.

The chain follower 30 keeps the oil nozzles 40 aligned precisely with the links 2 along each side of the chain C, even when the chain C moves laterally, so that each delivery of oil from the oil nozzles 40 can flow between the adjacent links 2 at a pin 4.

This invention is intended to cover all changes and modifications of the example of the invention herein chosen for purposes of the disclosure which do not constitute departures from the spirit and scope of the invention.

I claim:

1. In a chain system including a moving chain having links arranged in two distinct spaced apart rows which are parallel and extend longitudinally of the chain, and cross pieces extending transversely of the chain and connecting successive links in the rows, all of the cross pieces being parallel and each of the rows being continuous so that no gaps exist between adjacent links of the rows, the chain having a tendency to move laterally as it moves in the normal longitudinal direction of chain advancement; an improved chain lubricating apparatus comprising: an anchor past which the chain moves; a chain follower bearing against the cross pieces on the chain and confined in the lateral direction by the links so that when the chain moves laterally the follower moves laterally with it; restraining means connecting the follower with the anchor for restraining the follower and thereby preventing it from moving in the direction of chain advancement, the restraining means permitting the follower to move laterally with respect to the anchor so that the follower will follow lateral movement of the chain; at least one lubricant nozzle carried by the follower and directed toward the chain; a source of lubricant; and delivery means between the source of lubricant and the nozzle for forcing lubricant out of said at least one lubricant nozzle and onto the chain, whereby the lubricant will be deposited at the correct lateral location on the chain notwithstanding lateral movement of the chain.

2. The structure according to claim 1 wherein the follower rests on and is supported by the chain.

3. The structure according to claim 2 wherein the chain links project beyond the cross pieces and the follower is narrower than the spacing between the two rows of links so that it fits between the links of the two rows and is confined laterally thereby.

4. In combination with a chain having connected links arranged in two distinct spaced apart rows which are parallel and extend longitudinally of the chain, and cross pieces connecting the links and extending transversely of the chain, all of the cross pieces being parallel and narrower than the links so that the links project beyond the cross pieces, the chain having a tendency to move laterally as it moves in the normal longitudinal direction of chain advancement; an improved apparatus for lubricating the chain, said apparatus comprising: a bar resting on the cross pieces of the chain, the bar being slightly narrower than the spacing between the two rows of links so that it fits between the two rows of links and is confined in the lateral direction by the links; means connecting the bar to an anchor past which the chain moves to prevent the bar from moving in the direction of chain advancement, said means permitting the bar to move laterally with the chain; a pair of nozzles on the bar with one of the nozzles of said pair of nozzles being directed toward one row of links and the other of the nozzles of said pair nozzles being directed toward the other row of links; and means for delivering lubricant to the pair of nozzles and for forcing the lubricant from the pair of nozzles, whereby the lubricant is directed toward the links irrespective of the lateral position assumed by the chain.

5. The structure according to claim 4 wherein the bar extends over a plurality of cross pieces on the chain.

6. The structure according to claim 4 wherein the means connecting the bar to a fixed anchor permits the bar to follow vertical motion of the chain as well as lateral motion.

7. The structure according to claim 6 wherein the means connecting the bar to a fixed anchor is a rigid link which is pivotally connected to the bar and to the fixed anchor.

8. The structure according to claim 5 wherein the end of the bar toward which the chain is advanced is beveled so that the included angle between that end and the chain is an acute angle.

9. The structure according to claim 5 wherein both ends of the bar are beveled so that the included angles between the ends of the bar and the chain are acute angles.

10. A device according to claim 4 wherein the portion of the chain on which the bar is supported is substantially horizontal.

* * * * *